US008806957B2

(12) United States Patent
Laursen et al.

(10) Patent No.: US 8,806,957 B2
(45) Date of Patent: Aug. 19, 2014

(54) ULTRASONIC FLOW METER HOUSING FORMED BY A MONOLITHIC POLYMER STRUCTURE

(75) Inventors: Peter Schmidt Laursen, Skanderborg (DK); Søren Tønnes Nielsen, Solbjerg (DK)

(73) Assignee: Kamstrup A/S, Skanderborg (DK)

( * ) Notice: Subject to any disclaimer, the term of this patent is extended or adjusted under 35 U.S.C. 154(b) by 204 days.

(21) Appl. No.: 13/515,488

(22) PCT Filed: Dec. 15, 2010

(86) PCT No.: PCT/DK2010/050339
§ 371 (c)(1),
(2), (4) Date: Aug. 8, 2012

(87) PCT Pub. No.: WO2011/072693
PCT Pub. Date: Jun. 23, 2011

(65) Prior Publication Data
US 2013/0139610 A1    Jun. 6, 2013

(30) Foreign Application Priority Data
Dec. 15, 2009   (EP) .................................... 09179317

(51) Int. Cl.
*G01F 1/58*    (2006.01)
(52) U.S. Cl.
USPC ..................................................... 73/861.18
(58) Field of Classification Search
USPC ................................ 73/861.18, 861.27, 24.01
See application file for complete search history.

(56) References Cited

U.S. PATENT DOCUMENTS

| 5,494,038 | A | * | 2/1996 | Wang et al. .................... 600/459 |
| 5,501,098 | A | * | 3/1996 | Cadet et al. .................... 73/24.01 |
| 5,515,733 | A | * | 5/1996 | Lynnworth ................. 73/861.27 |
| 5,770,800 | A | * | 6/1998 | Jenkins et al. .................... 73/623 |
| 6,119,521 | A | * | 9/2000 | Shivashankara et al. ....... 73/589 |
| 6,612,306 | B1 | | 9/2003 | Mault |

FOREIGN PATENT DOCUMENTS

| DE | 100 51 534 A1 | 4/2002 |
| EP | 1 482 284 A1 | 12/2004 |
| EP | 1 983 311 A2 | 10/2008 |
| EP | 2 083 250 A1 | 7/2009 |
| EP | 2 236 993 A1 | 10/2010 |
| WO | WO 2004/111968 A2 | 12/2004 |
| WO | WO 2009/121885 A1 | 3/2009 |

* cited by examiner

*Primary Examiner* — Jewel V Thompson
(74) *Attorney, Agent, or Firm* — Knobbe Martens Olson & Bear LLP

(57) ABSTRACT

The invention relates to an ultrasonic flow meter housing and to an ultrasonic flow meter comprising a housing. The housing is a monolithic polymer structure being cast in one piece. The monolithic structure includes a straight flow tube and a cavity separated from the flow tube, where a shared wall part forms part of the wall of the flow tube and of an inside surface of the cavity. The cavity is arranged for housing at least one ultrasonic transducer at the shared wall part, and a measurement circuit operationally connected to the at least one ultrasonic transducer. In an embodiment, the cavity only has a single opening which can be sealed off by a cover.

15 Claims, 4 Drawing Sheets

ULTRASONIC FLOW METER HOUSING FORMED BY A MONOLITHIC POLYMER STRUCTURE

CROSS REFERENCE TO RELATED APPLICATIONS

This application claims the benefit and priority to and is a U.S. National Phase Application of PCT International Application Number PCT/DK2010/050339, filed on Dec. 15, 2010, designating the United States of America and published in the English language, which is an International Application of and claims the benefit of priority to European Patent Application No. 09179317.4, filed on Dec. 15, 2009. The disclosures of the above-referenced applications are hereby expressly incorporated by reference in their entireties.

FIELD OF THE INVENTION

The invention relates to an ultrasonic flow meter housing and to an ultrasonic flow meter comprising a housing. In particular, the invention relates to an ultrasonic flow meter with a polymer housing.

BACKGROUND OF THE INVENTION

Ultrasonic based consumption meters for calculating a consumed quantity of water, heat, cooling, gas or the like, typically has a flow part of metal with a through-going opening that forms a flow passage. Attached to the flow passage is a compartment or housing with a cavity for housing electronic components. The housing serves to protect electronic components, such as a measuring circuit that controls the ultrasonic transducer(s), as well as any additional electronic equipments, such as a calculation circuit for calculating the consumed quantity, a display for displaying a value representing the consumed quantity, a battery for powering the electronic components, a radio communication module, etc.

The fabrication of a flow meter comprises a number of production steps. To provide a flow meter which is cost-efficient to produce, it is necessary to control the fabrication process to limit the number of steps involved.

The international patent application WO 2009/129885 A1 discloses an ultrasonic measuring arrangement comprising a polymer-based measurement tube and housing, where the housing is injection moulded onto the measuring tube to connect them in a seal-less and seam-less manner. While this arrangement possibly is simpler to produce than flow meters based on metallic measurement tubes, it nevertheless suffers from the problem that a number of moulding steps are required in order to produce the assembly.

SUMMARY OF THE INVENTION

It may be seen as an object of the invention to provide an ultrasonic flow meter which can be produced and assembled with a limited number of steps.

In a first aspect, the invention provides an ultrasonic flow meter housing in the form of a monolithic polymer structure being cast in one piece. The monolithic structure includes a flow tube and a cavity separated from the flow tube, where the flow tube defines a through-going straight flow section arranged for passage of a fluid between an inlet and an outlet, and where a part of a wall the flow section is part of an inside surface of the cavity, so that the flow section and the cavity has a shared wall area;
wherein the cavity is arranged for housing at least one ultrasonic transducer, at the shared wall area; and
a measurement circuit operationally connected to the at least one ultrasonic transducer so as to allow measurement of a flow rate of the fluid.

A flow meter with a housing in accordance with the present invention can be fabricated with a reduced number of steps compared to existing meters, since only a single step is used to form the monolithic polymer structure. The invention relies on the insight that a flow meter housing which has a straight flow section separated from a cavity in a manner where a part of the wall of the flow section is part of the inside of the cavity, can on one hand be cast in a single step, and can on the other hand provide a housing which is suitable for housing all necessary components of a flow meter.

In a general embodiment, the shared area may comprise openings through to the flow tube in order to mount ultrasonic transducers in the openings to provide direct contact with the flowing fluid. Such mount requires a fluid tight sealing between the transducers and the openings to hinder fluid flowing from the flow section to the cavity. Advantageously, in a preferred embodiment, the flow tube and the cavity are separate by a water-tight wall and the at least one ultrasonic transducer is arranged to transmit ultrasonic signals from the cavity through the wall in the shared area into the flow section by utilization of the so-called matching layer principle. In this embodiment, the ultrasonic transducer is simply positioned in contact with the shared area avoiding any sealing means. Thereby removing any steps necessary for obtaining a fluid-tight assembly, as well as any parts needed to provide the fluid-tight assembly. The matching layer principle is, e.g., further disclosed in the published patent application EP 2 037 231.

Advantageously, the cavity is provided with only a single opening which is arranged with means for sealed connection by a cover. In this manner, any electronic equipment provided in the enclosure of the cavity, can be sealed off from the surroundings by only a single sealing means. Moreover, since the flow section may be sealed by the shared wall/inner surface of the flow section, this single sealing is to seal the enclosure from the ambient conditions in which the flow meter is placed, and not against the flowing fluid.

In a second aspect, the invention relates to an ultrasonic flow meter comprising a housing in accordance with the first aspect of the invention.

It is appreciated that the same advantages and equivalent embodiments apply for the second aspect as mentioned for the first aspect.

Further advantageous embodiments of the first and second aspects are disclosed in the description of the embodiments.

In embodiments, the ultrasonic flow meter may be or may be part of a charging consumption meter, e.g. a water meter, gas meter, heat meter, or cooling meter. The consumption meter may be used in connection with district heating or district cooling. The consumption meter may be a legal meter, i.e. a meter which is subdued to regulatory demands. Such regulatory demands may be demands to the precision of the measurements.

BRIEF DESCRIPTION OF THE DRAWINGS

Embodiments of the invention will be described, by way of example only, with reference to the drawings, in which.

DESCRIPTION OF EMBODIMENTS

Figure 1A:
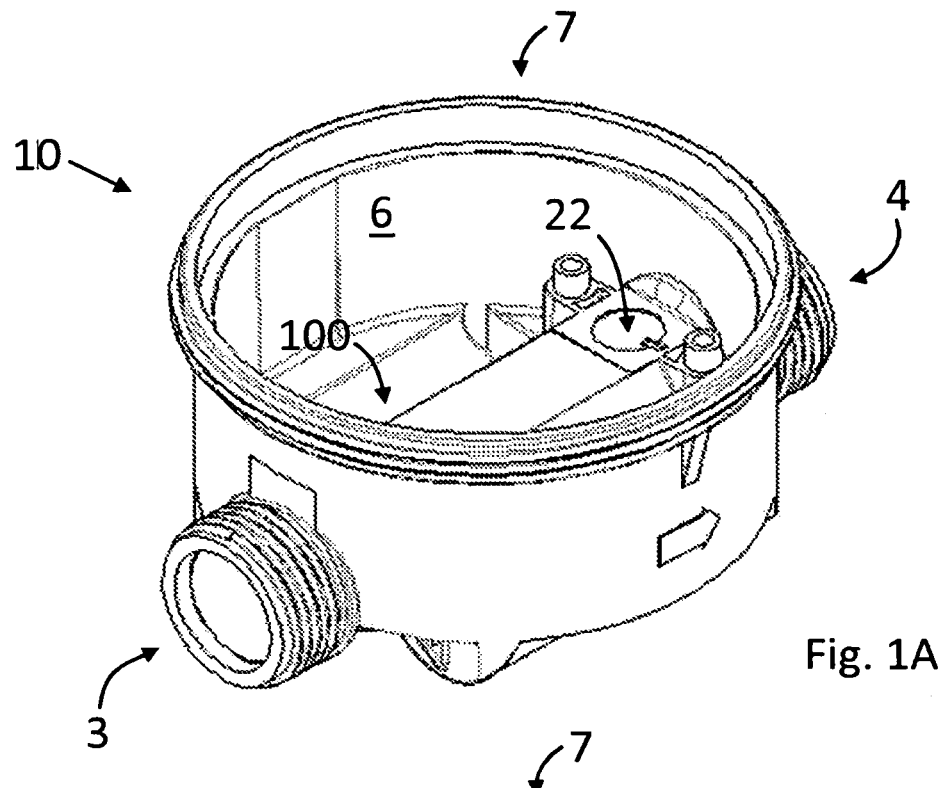
FIGS. 1A and 1B illustrate an embodiment of a flow meter housing.
Figure 1B:
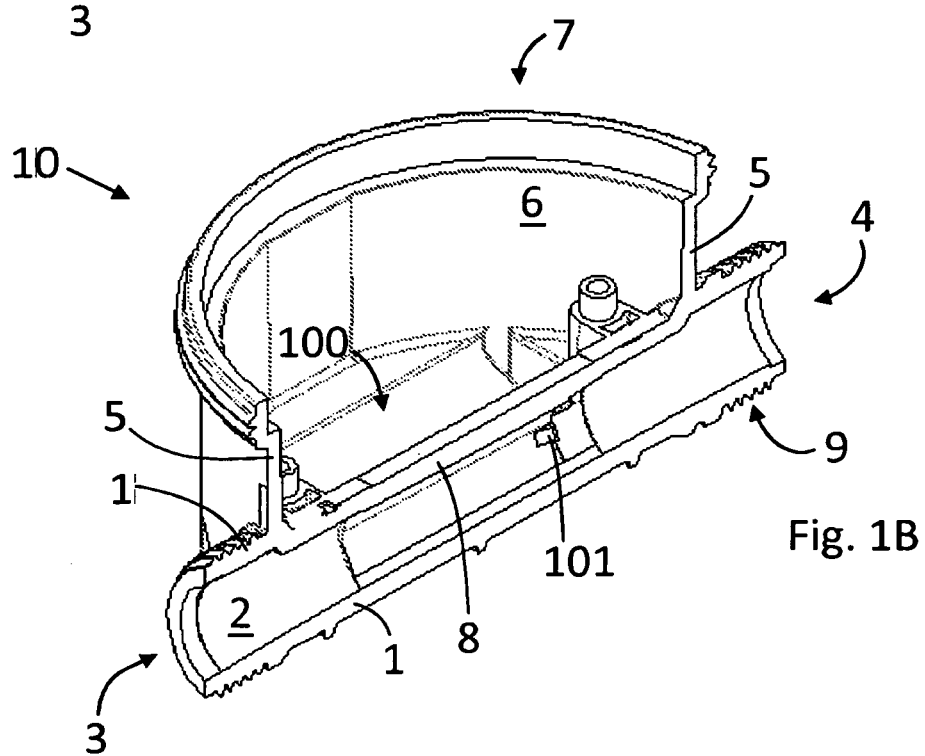

FIGS. 1A and 1B illustrate an embodiment of a flow meter housing 10 in a perspective view in FIG. 1A and in a cut-away view in FIG. 1B.

The housing is provided as a polymer structure cast in one piece. The housing comprises a first wall 1, as best seen in FIG. 1B, which forms a straight flow passage 2 or flow tube in the form of a through-going opening between openings 3 and 4, i.e. between an inlet 3 and an outlet 4. The cross-sectional areas of the inlet and the outlet being parallel along the flow passage. This first wall 1 preferably has a circular outer cross section towards the ends 3, 4 in an appropriate size to fit to connecting piping. The end section are typically provided with a threaded part 9, however other types of connection means may be used. Second walls 5 form a cavity 6 with an opening 7. The first and second wall share a shared wall area 8 being a part of the flow section as well as part of the inner surface of the cavity. The shared wall area, in particular in the area dedicated to supporting the ultrasonic transducers, is parallel with the flow direction running from the inlet to the outlet. While the through-going embodiment of the flow meter housing is as illustrated in FIGS. 1A and 1B, it is understood that the flow meter housing can be shaped in many ways to suit limitations regarding outer dimensions and dimensions and shapes of the components to be housed inside the cavity.

Figure 2:
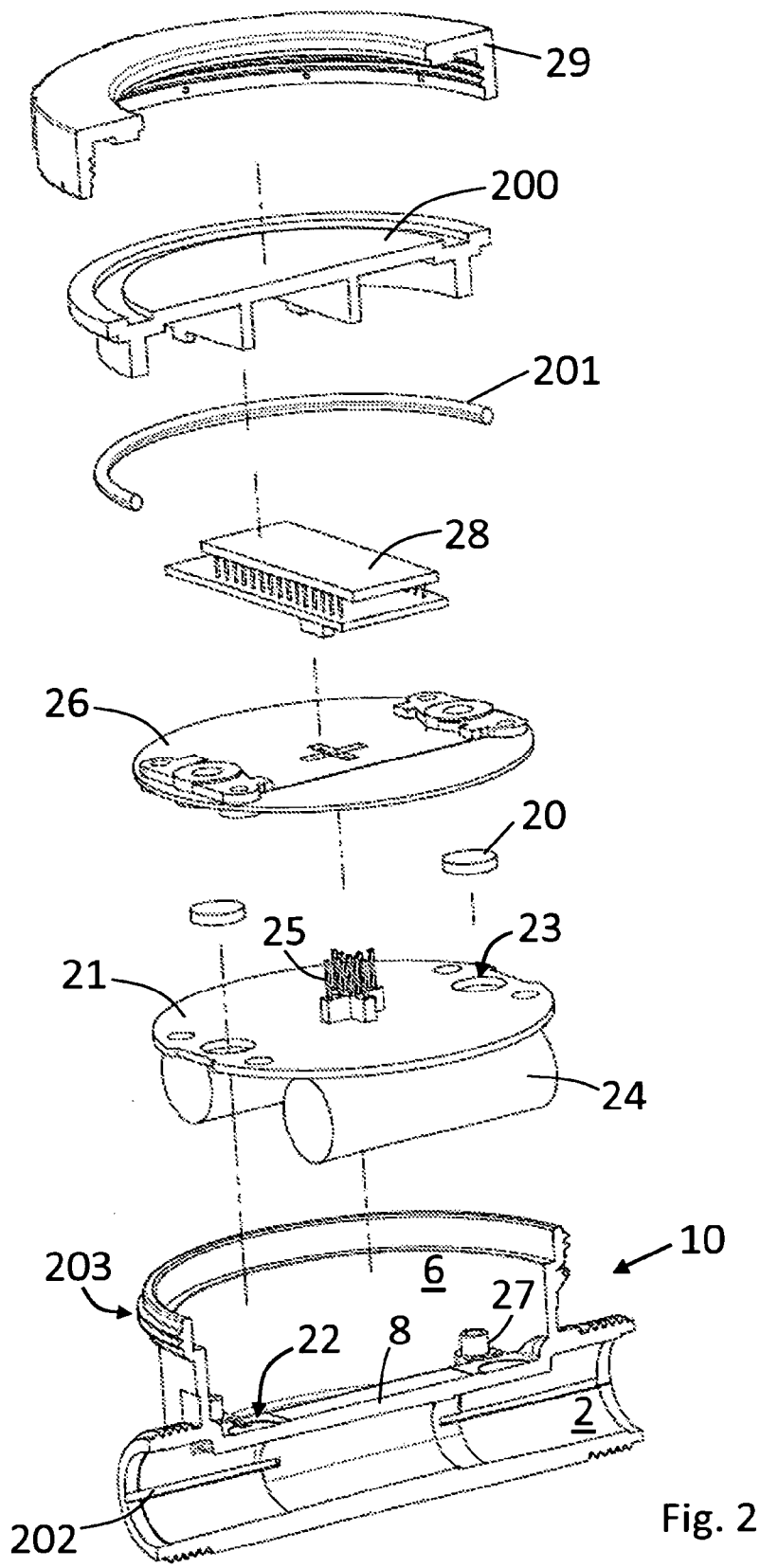
FIG. 2 illustrates an exploded view of an embodiment of an ultrasonic flow meter.

FIG. 2 illustrates an exploded view of an embodiment of an ultrasonic flow meter in the form of a water meter based on a flow meter housing 10 in accordance with embodiments of the present invention.

The single unit housing 10, and in particular the cavity 6, is arranged for housing at least one ultrasonic transducer, here two transducers 20, and a circuit board 21 comprising the measuring circuit operationally connected to the transducers for measuring a flow rate of fluid flowing through the flow passage 2. The illustrated water meter is a compact meter which in addition to the transducers and the measuring circuit has a number of further electronic components in the cavity 6, as will be discussed in the following.

The flow tube wall, i.e. the shared area 8 of the flow tube and the cavity, comprises two depressed areas 22 for accommodating the ultrasonic transducers 20 (see also FIG. 1A). The depressed areas are areas dedicated to receiving the transducers. In the area supporting the transducers, the thickness of the wall is adjusted to a proper thickness to ensure transmission of the emitted ultrasonic wave of the ultrasonic transducer through the wall, possibly under the constraint that the area should have thickness which ensures a sufficient strength. The area may thus be a depression, a protrusion, or the entire shared area may be provided with the proper wall thickness. In embodiments, the thickness of the wall is matched to a number of half or whole wavelengths of the emitted ultrasonic wave of the transducer. The desired wall thickness can be provided in connection with the moulding of the housing without need for reworking. Moreover, the transducer is acoustically coupled to the wall, typically by means of a coupling material, such as a layer of glue or grease or other suitable material.

In assembled state, the ultrasonic transducers 20 are preferably mechanically and electrically connected to the circuit board 21, by means of fixing members, such as metal clips or solder (not shown). This form of the housing thus supports mount of a separate unit comprising the ultrasonic transducers and the measurement circuit (and possible further components) which can be assembled and tested before final assembly of the flow meter.

In the illustrated embodiment, the two ultrasonic transducers 20 are arranged in matching openings 23 of the circuit board 21. These openings serve to position the transducers relative to each other, in relation to the circuit board as well as in relation to the flow tube.

The circuit board 21 further includes batteries 24 attached to the bottom side, and a set of terminals 25 attached the upper side. The batteries 24 are attached so as to fit, when assembled, within elongated spaces 100 (see FIGS. 1A and 1B) arranged symmetrically around the flow tube of the cavity, on each side of the flow tube 2. The provision of such elongated spaces allows for a compact battery powered flow meter with batteries housed inside the cavity.

The flow meter further comprises a bracing element 26 serving to press the transducers 20, when assembled, against the surface of the wall of the flow tube 2. Holes through the bracing element and through the circuit board are provided for fastening by means of screws (not shown) to corresponding mounting means 27 formed in the housing. The bracing element 26 can be formed by a printed circuit board, by a polymeric plate, e.g. formed in a pressure die casting process, or by a sheet of metal.

In the illustrated embodiment, the circuit board 21 in addition to the measuring circuit for operating the transducers, also comprises a calculation circuit arranged to calculate the consumed amount of fluid based on the flow rate, as determined by the measuring circuit. Such calculation circuit may also be provided by a separate entity.

The flow meter further comprises a display element 28, here arranged on an upper side a circuit board arranged with a set of terminals to engage with the terminals 25.

A threaded top part 29 is together with a top lid 200 arranged to form a cover to engage with the housing which on its outer periphery has a corresponding thread 203. The top lid has a transparent part in front of the display element. A flexible O-ring 201 serves to provide a water-tight enclosure between the top lid 200 and the opening of the cavity 6, thereby providing a water-tight cavity 6.

Preferably, the shared area 8 comprises a flat section. Such flat section is advantageous in that it can serve as an resting or bearing surface of electronic components, in particular of the measuring circuit for controlling the transducers. The shared area is preferable flat in a plane which is parallel with a plane of the opening of the cavity.

In the illustrated embodiment, all components are provided in a layered manner, and are all mountable simply by mounting a next layer on top of a previous layer. This layered structure is supported by the flat shared area which serves as a common resting surface. Thus the structure of the housing facilitates a very high degree of automated assembly.

Additional circuits, component or elements may also be provided inside the cavity, such as a radio communication unit for remote reading of the meter, and/or other types of wireless communication means, including any antenna or transmitting means. In this regard, the material of the housing is preferable made of a material which is transparent to the selected communication signals, in particular transparent to radio signal.

Figure 3A:
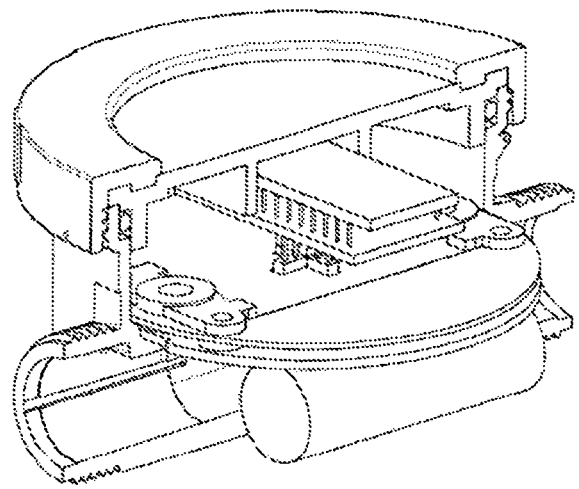
FIG. 3A and FIG. 3B illustrate the water meter of FIG. 2 in an assembled state.
Figure 3B:
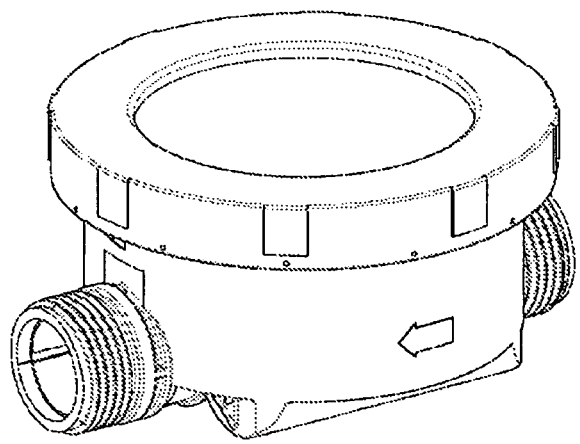

FIG. 3A and FIG. 3B illustrate the water meter of FIG. 2 in an assembled state. FIG. 3A illustrates a cut-away view showing the components within the cavity of the housing, and FIG. 3B illustrates the closed water meter as seen from the outside.

In the illustrated embodiment a very simple structure of the meter is provided which only requires a cover or lid to fit watertight to the opening in order to provide an effective humidity sealing of the elements inside the cavity.

In an alternative embodiment, a covered is not provided in the form of a lid. Instead, the cavity may be filled with a casting material to seal off the elements inside the cavity.

Figure 4:
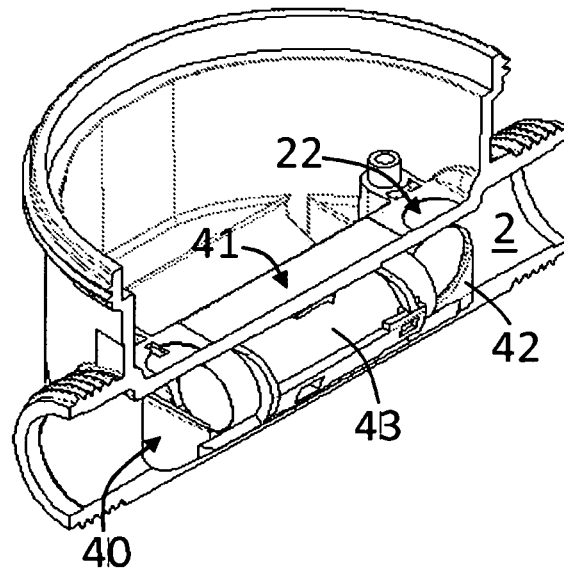
FIG. 4 illustrates a flow meter housing with a measurement tube element inserted into the flow tube.

FIG. 4 illustrates a flow meter housing similar to the housing of FIG. 1B except that a measurement tube element 40 is inserted into the flow tube 2.

In the flow meter of the type illustrated here, the ultrasonic transducers are provided in the same plane on a flat section of the wall of the flow tube. Here in the recesses 22. In such an embodiment, the ultrasonic signal is introduced from a first transducer into the flow tube along a direction which is perpendicular to a direction of the flow, and then reflected from a reflector surface 42 to run along the measuring section here defined by a measuring tube 43, to be reflected from a second reflector and finally detected by the second transducer.

In order to arrange a measurement tube element or an ultrasonic reflector arrangement correctly in the flow tube, the flow meter housing may be provided with one or more protrusions or indentions at the inside of the flow tube to engage with the measurement tube element or reflector arrangement. In FIG. 1B a protrusion 101 is illustrated, whereas in FIG. 2 an indentation is provided in the form of a slit 202.

As an alternatively to a measuring tube element, an inside of the through-going opening of the monolithic polymer structure may be shaped to define the measuring tube. Additionally, as an alternative to a reflector arrangement, the inner side of the through-going opening can also be formed, e.g. cast, into a suitable shape such that the inner side of the through-going opening forms a reflector arrangement.

In the illustrated flow meter, the temperature of the flowing fluid is not measured. In order to provide an energy meter, i.e. a flow meter which can measure the consumed amount of energy, a temperature measurement needs to be performed. To facilitate such measurement, the flow meter may comprise a temperature sensor mounted so as to sense a temperature of the fluid inside the through-going opening, for example by means of a metal pocket cast into the monolithic polymer structure, or by other suitable means.

A proper selection of polymer ensures a good barrier to intrusion of moist, or other undesired elements, into the cavity, e.g. in the form of water that penetrates through the wall of the flow tube or in the form of moist penetrating through the cavity wall from the ambient. Nevertheless, polymer is not totally impermeable to water. While a polymer housing provides a sufficient barrier to water for many applications, moist inhibiting means may be arranged inside the cavity, such as in the form of a material cast around at least part of the measurement circuit and/or the calculation circuit, or such as a moist inhibiting gas, or such as a moist absorbing gel. In an alternative approach, the resistivity against humidity penetrating through the polymer into the cavity may be increased by coatings or foils applied to the inside surface of the flow tube and/or the cavity.

Examples of suitable polymer materials for the housing are: PPS, PES, PPE, a PS compound, or PA12, which in addition to providing a low moist permeability is also strong enough to provide a structure that does not break due to mechanical forces applied to the structure when it is rigidly mounted in a piping installation. In further embodiment, the polymer material may be a composite material, i.e. based on a polymer and another type of material, such as carbon, glass or the like.

The illustrated flow meter is battery powered, however a substantially watertight electrical connector may be arranged in the cavity wall or cover to establish electrical connection to supply electric power to one or more electric power consuming elements in the cavity. An electrical connector may also serve to transfer data between a circuit arranged in the cavity and the outside, e.g. the electrical connector may be connected to an externally arranged calculation circuit.

Figure 5A:
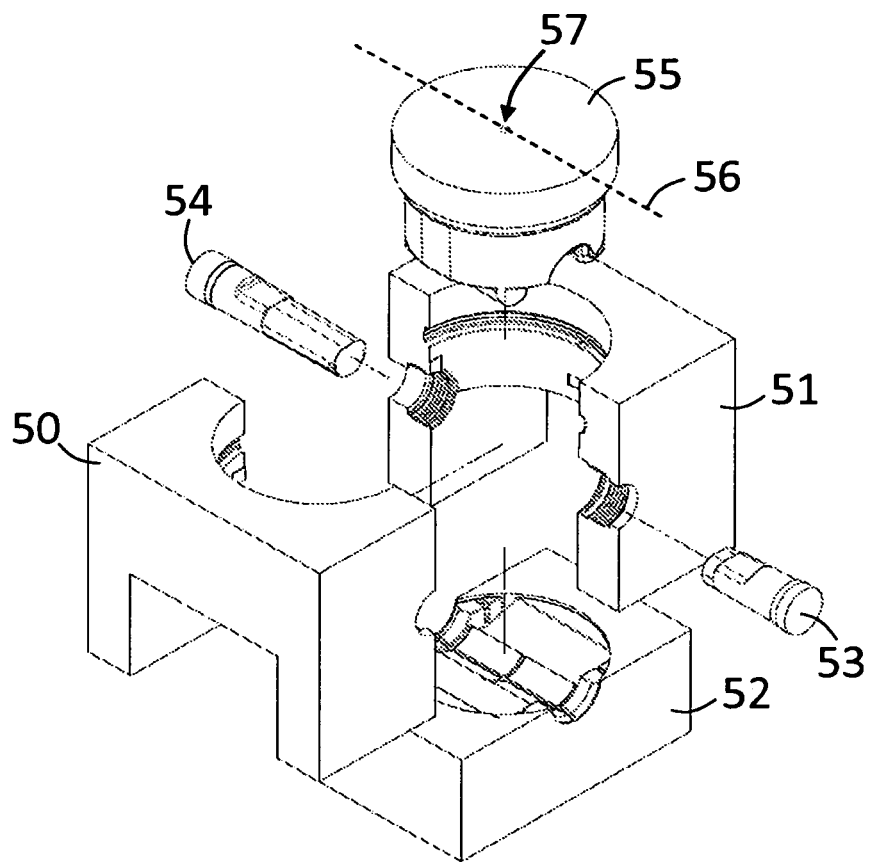
FIGS. 5A and 5B illustrate the moulding die in unassembled perspective view (FIG. 5A) and in assembled cross-sectional view (FIG. 5B).

FIG. 5A illustrates, in perspective view, a casting die or form that may be used in an injection moulding process to mould a flow meter housing. The die comprises two halves 50, 51, a bottom 52, as well as three cores: two side cores 53, 54 and a top core 55. A die of this type can be used to fabricate the polymer structure as a monolithic structure which requires no additional production steps in order to be used as a housing for a working ultrasonic flow meter. By having a housing with a straight flow section between the inlet and the outlet, and by having a shared wall area between the cavity and the flow tube, the housing can be cast in a single step, since all elements of the flow meter housing can be formed from the combination of outer shelves 50-52 and cores 53-55.

Figure 5B:
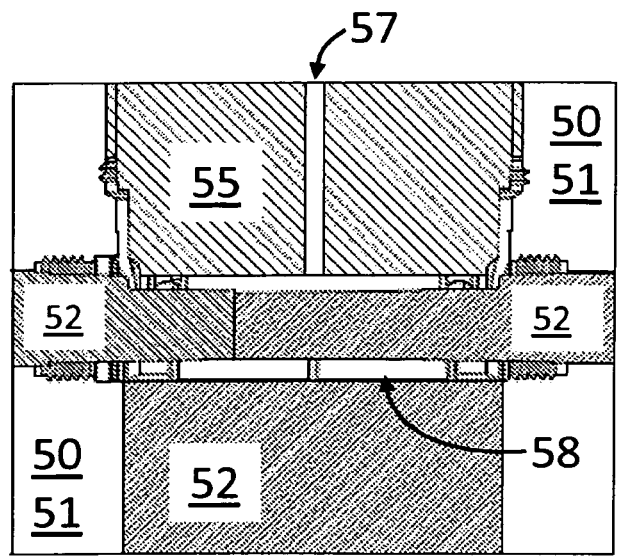

FIG. 5B illustrates a cross-section of the casting die of FIG. 5A in assembled state. The cross-section is obtained along the line 56.

As can be seen, in assembled state, an injection channel 57, provides access to a negative 58 of a flow meter housing in accordance with embodiments of the present invention.

Although the present invention has been described in connection with the specified embodiments, it should not be construed as being in any way limited to the presented examples. The invention can be implemented by any suitable means; and the scope of the present invention is to be interpreted in the light of the accompanying claim set. Any reference signs in the claims should not be construed as limiting the scope.

The invention claimed is:

1. An ultrasonic flow meter housing comprising:
   a monolithic polymer structure being cast in one piece, the monolithic structure includes a flow tube and a cavity separated from the flow tube, wherein the flow tube defines a through-going straight flow section arranged for passage of a fluid between an inlet and an outlet, wherein a part of a wall of the flow section is part of an inside surface of the cavity, so that the flow section and the cavity has a shared wall area; and
   wherein the cavity is arranged for housing
   at least one ultrasonic transducer, at the shared wall area; and
   a measurement circuit operationally connected to the at least one ultrasonic transducer so as to allow measurement of a flow rate of the fluid.

2. The flow meter housing according to claim 1, wherein the flow tube and the cavity are separated by a water-tight wall, the shared wall area being part of the water-tight wall.

3. The flow meter housing according to claim 1, wherein the cavity only has a single opening.

4. The flow meter housing according to claim 3, wherein a rim of the cavity is arranged for sealed connection with a cover, so that the cover and the cavity define an enclosure with only a single sealing area.

5. The flow meter housing according to claim 1, wherein the shared wall area comprises at least one area arranged to receive the at least one ultrasonic transducer, the at least one area having a wall thickness adapted to allow transmission of the emitted ultrasonic wave of the ultrasonic transducer.

6. The flow meter housing according to claim 1, wherein the flow section has one or more protrusions or indentions at the inside of the flow section serving to engage with an associated measurement tube element or an ultrasonic reflector arrangement.

7. The flow meter housing according to claim 1, wherein both ends of the flow tube comprise engagement means for connection to a piping system.

8. The flow meter housing according claim 1, further comprising a metal pocket cast into the flow tube.

9. The flow meter housing according to claim 1, wherein the monolithic polymer structure is shaped such that a part of the cavity provides an elongated space along the flow tube.

10. The flow meter housing according to claim 1, wherein the shared area comprises a flat section.

11. An ultrasonic flow meter comprising:
a flow meter housing in the form of a monolithic polymer structure being cast in one piece, the monolithic structure includes a flow tube and a cavity separated from the flow tube, wherein the flow tube defines a through-going straight flow section arranged for passage of a fluid between an inlet and an outlet, and wherein a part of a wall of the flow section is part of an inside surface of the cavity, so that the flow section and the cavity has a shared wall area;
at least one ultrasonic transducer, positioned at the shared wall area inside the cavity; and
a measurement circuit operationally connected to the at least one ultrasonic transducer so as to allow measurement of a flow rate of the fluid flowing through the through-going opening, the measurement circuit being housed inside the cavity.

12. The flow meter according to claim 11, wherein the flow tube and the cavity are separated by a water-tight wall, and wherein the at least one ultrasonic transducer is arranged to transmit ultrasonic signals through the wall of the monolithic polymer structure separating the flow tube and the cavity.

13. The flow meter according to claim 11, wherein the flow meter comprises at least two ultrasonic transducers positioned at the shared wall area.

14. The flow meter according to claim 11, wherein the cavity only has a single opening which has been covered in a sealed manner by a cover, and wherein the cavity encloses a moisture inhibiting means.

15. The flow meter according to claim 11, wherein the cavity further comprises one or more of:
a calculation circuit arranged to calculate a consumed quantity of the flowing fluid based on the measured flow rate of the fluid;
at least one battery for driving at least the measurement circuit;
a display arranged for displaying at least the consumed quantity of the flowing fluid;
a signal transmitter for wireless transmission of at least the consumed quantity of the flowing fluid; or
a temperature sensor arranged to measure the temperature of the flowing fluid.

* * * * *